United States Patent
Nishino et al.

(10) Patent No.: US 12,427,704 B2
(45) Date of Patent: Sep. 30, 2025

(54) PRODUCTION METHOD FOR HEAT-RESISTANT RESIN COMPOSITION

(71) Applicant: DENKA COMPANY LIMITED, Tokyo (JP)

(72) Inventors: Kohei Nishino, Tokyo (JP); Tatsuhiro Matsubara, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 486 days.

(21) Appl. No.: 18/018,000

(22) PCT Filed: Sep. 22, 2021

(86) PCT No.: PCT/JP2021/034755
§ 371 (c)(1),
(2) Date: Jan. 25, 2023

(87) PCT Pub. No.: WO2022/071050
PCT Pub. Date: Apr. 7, 2022

(65) Prior Publication Data
US 2023/0311394 A1   Oct. 5, 2023

(30) Foreign Application Priority Data
Sep. 29, 2020   (JP) .................................. 2020-163975

(51) Int. Cl.
*C08L 79/08*   (2006.01)
*B29C 48/00*   (2019.01)
(Continued)

(52) U.S. Cl.
CPC ............ *B29C 48/022* (2019.02); *B29C 48/40* (2019.02); *B29C 48/57* (2019.02); *C08L 79/08* (2013.01);
(Continued)

(58) Field of Classification Search
CPC ........ C08L 35/06; C08L 212/08; C08L 55/02; C08L 25/12; C08L 25/08; C08L 33/24;
(Continued)

(56) References Cited

U.S. PATENT DOCUMENTS

| 4,908,400 A | 3/1990 | Hirose et al. |
| 2011/0319567 A1 | 12/2011 | Noguchi et al. |

(Continued)

FOREIGN PATENT DOCUMENTS

| EP | 3 954 732 A1 | 2/2022 |
| JP | S59-152946 A | 8/1984 |

(Continued)

OTHER PUBLICATIONS

"Database WPI", Week 2021024, Thomson Scientific, London, GB; AN 2021-22252T XP002811205.

(Continued)

*Primary Examiner* — Mark S Kaucher
(74) *Attorney, Agent, or Firm* — Oliff PLC (57) ABSTRACT

A method for manufacturing a heat resistant resin composition having superior dispersibility of maleimide-based copolymer, the method including: a melt-kneading step to melt and knead a maleimide-based copolymer (A) and at least one resin (B) selected from the group consisting of ABS resin, ASA resin, AES resin, and SAN resin with an extruder; wherein: a ratio of a melt viscosity of the maleimide-based copolymer (A) with respect to a melt viscosity of the resin (B) obtained with a shear rate of 120/sec and a cylinder temperature of a kneading unit of the extruder is 1.0 or higher and lower than 3.4, is provided.

6 Claims, 1 Drawing Sheet

(51) Int. Cl.
- *B29C 48/40* (2019.01)
- *B29C 48/57* (2019.01)
- *B29K 25/00* (2006.01)
- *B29K 55/02* (2006.01)
- *B29K 79/00* (2006.01)
- *B29K 105/00* (2006.01)

(52) U.S. Cl.
CPC ...... *B29K 2025/08* (2013.01); *B29K 2055/02* (2013.01); *B29K 2079/08* (2013.01); *B29K 2105/0044* (2013.01); *C08L 2201/08* (2013.01); *C08L 2205/03* (2013.01)

(58) Field of Classification Search
CPC ........ C08L 35/00; C08F 22/40; C08F 122/40; C08F 222/40
See application file for complete search history.

(56) References Cited

U.S. PATENT DOCUMENTS

| | | | |
|---|---|---|---|
| 2017/0285226 A1* | 10/2017 | Kakinoki | G02B 3/00 |
| 2019/0040176 A1 | 2/2019 | Kamata et al. | |
| 2020/0369813 A1 | 11/2020 | Matsumoto et al. | |

FOREIGN PATENT DOCUMENTS

| | | | |
|---|---|---|---|
| JP | H07-278401 A | | 10/1995 |
| JP | H10-36614 A | | 2/1998 |
| JP | 2000-72948 A | | 3/2000 |
| JP | 2002-003673 A | | 1/2002 |
| JP | 2003-041080 A | | 2/2003 |
| JP | 2004-182835 A | | 7/2004 |
| JP | 2004-346148 A | | 12/2004 |
| JP | 2004-346149 A | | 12/2004 |
| JP | 2006176578 A | * | 7/2006 |
| JP | 2007-321132 A | | 12/2007 |
| JP | 2017-141407 A | | 8/2017 |
| JP | 2018-188545 A | | 11/2018 |
| KR | 100515590 B1 | | 9/2005 |
| WO | 2010/082617 A1 | | 7/2010 |
| WO | 2018/116850 A1 | | 6/2018 |
| WO | 2019/138996 A1 | | 7/2019 |

OTHER PUBLICATIONS

Nov. 22, 2021 Search Report issued in International Patent Application No. PCT/JP2021/034755.

\* cited by examiner

PRODUCTION METHOD FOR HEAT-RESISTANT RESIN COMPOSITION

TECHNICAL FIELD

The present invention relates to a production method for heat resistant resin composition having superior dispersibility of maleimide-based copolymer.

BACKGROUND

ABS resin is a thermoplastic resin which contains acrylonitrile, butadiene, and styrene as its main component. Due to its superior mechanical strength, appearance, chemical resistance, molding property and the like, ABS resin is used in a wide variety of applications including automobiles, home appliances, office automation equipment, housing materials, daily necessities and the like. On the other hand, in applications which require heat resistance such as interior material of automobiles, heat resistance may be insufficient. As a technique for improving the heat resistance, the following can be mentioned. For example, maleimide-based copolymer, α-methyl styrene-based copolymer and the like are used (Patent Literature 1, 2). In recent years, development in twin-screw extruders to increase torque and to deepen the groove of screw have been achieved, thereby enabling large discharge volume.

CITATION LIST

Patent Literature

[Patent Literature 1] JP 2003-41080A
[Patent Literature 2] WO 2010/082617A

SUMMARY OF INVENTION

Technical Problem

The present invention provides a production method for heat resistant resin composition having superior dispersibility of maleimide-based copolymer.

Solution to Problem (1) A method for manufacturing a heat resistant resin composition, the method comprising:
  a melt-kneading step to melt and knead a maleimide-based copolymer (A) and at least one resin (B) selected from the group consisting of ABS resin, ASA resin, AES resin, and SAN resin with an extruder; wherein:
  a ratio of a melt viscosity of the maleimide-based copolymer (A) with respect to a melt viscosity of the resin (B) obtained with a shear rate of 120/sec and a cylinder temperature of a kneading unit of the extruder is 1.0 or higher and lower than 3.4.
(2) The method for manufacturing the heat resistant resin composition of (1), wherein the melt-kneading step is performed under presence of an antioxidant (C).
(3) The method for manufacturing the heat resistant resin composition of (1) or (2), wherein the extruder is a twin-screw extruder.
(4) The method for manufacturing the heat resistant resin composition of (3), wherein a deep groove ratio of a screw of the kneading unit of the twin-screw extruder is 1.55 or higher.

Effect of the Invention

The production method of the heat resistant resin composition can provide a heat resistant resin composition having superior dispersibility of maleimide-based copolymer. Therefore, the dispersibility of maleimide-based copolymer with resin such as ABS resin becomes sufficient. Accordingly, even when manufacture of molded article is performed under a condition of large discharge volume using deep groove screw which is somewhat inferior in dispersing ability, the maleimide-based copolymer can be dispersed sufficiently, thereby allowing to obtain a molded article without defects in appearance.

EMBODIMENTS OF THE INVENTION

Explanation of Terms

In the present specification, the phrase "A to B" means A or more and B or less.

Hereinafter, the embodiments of the present invention will be described in detail. The following embodiments can be combined with each other.

The resin composition of the present invention is a heat resistant resin composition obtained by melt-kneading a maleimide-based copolymer (A) with at least one resin (B) selected from the group consisting of SAN resin, ABS resin, ASA resin, and AES resin, using an extruder.

The maleimide-based copolymer (A) is a copolymer including a maleimide-based monomer unit and a styrene-based monomer unit. In the present invention, the maleimide-based copolymer (A) can further include an acrylonitrile-based monomer unit and an unsaturated dicarboxylic anhydride-based monomer unit.

The maleimide-based monomer unit is N-alkyl maleimide such as N-methyl maleimide, N-butyl maleimide, and N-cyclohexyl maleimide; and N-phenyl maleimide, N-chlorophenyl maleimide, N-methylphenyl maleimide, N-methoxyphenyl maleimide, and N-tribromophenyl maleimide for example. Among these, N-phenyl maleimide is preferable. These maleimide-based monomer units can be used alone, or two or more of these can be used in combination. The maleimide-based monomer unit can be obtained by using a raw material comprising maleimide-based monomer. Otherwise, a raw material comprising unsaturated dicarboxylic monomer unit can be imidized using ammonia or primary amine.

The maleimide-based copolymer (A) preferably contains 30 to 70 mass % of maleimide-based monomer unit, more preferably 35 to 60 mass % of maleimide-based monomer unit with respect to 100 mass % of the maleimide-based copolymer (A). The content of the maleimide-based monomer unit is, specifically for example, 30, 35, 36, 37, 38, 39, 40, 41, 42, 43, 44, 45, 50, 55, 60, or 70 mass %, and can be in the range between the two values exemplified herein. When the content of the maleimide-based monomer unit is within such range, compatibility with at least one resin (B) selected from the group consisting of ABS resin, ASA resin, AES resin, and SAN resin described later is improved, and thus the impact strength of the resin composition becomes superior. The content of the maleimide-based monomer unit is a value measured by 13C-NMR.

The styrene-based monomer unit is, for example, styrene, o-methyl styrene, m-methyl styrene, p-methyl styrene, 2,4-dimethyl styrene, ethyl styrene, p-tert-butyl styrene, α-methyl styrene, α-methyl-p-methyl styrene and the like. Among these, styrene is preferable. These styrene-based monomer units can be used alone, or two or more of these can be used in combination.

The maleimide-based copolymer (A) preferably contains 20 to 60 mass % of styrene-based monomer unit, more preferably 35 to 55 mass % of styrene-based monomer unit with respect to 100 mass % of the maleimide-based copolymer (A). The content of the styrene-based monomer unit is, specifically for example, 20, 30, 40, 45, 46, 47, 48, 49, 50, 55, or 60 mass %, and can be in the range between the two values exemplified herein. When the content of the styrene-based monomer unit is within such range, compatibility with at least one resin (B) selected from the group consisting of ABS resin, ASA resin, AES resin, and SAN resin described later is improved, and thus the impact strength of the resin composition becomes superior. The content of the styrene-based monomer unit is a value measured by 13C-NMR.

Acrylonitrile-based monomer unit is, for example, acrylonitrile, methacrylonitrile, ethacrylonitrile, and fumaronitrile. Among these, acrylonitrile is preferable. These acrylonitrile-based monomer units can be used alone, or two or more of these can be used in combination.

The maleimide-based copolymer (A) preferably contains 0 to 20 mass % of acrylonitrile-based monomer unit, more preferably 0 to 15 mass % of acrylonitrile-based monomer unit with respect to 100 mass % of the maleimide-based copolymer (A). The content of the acrylonitrile-based monomer unit is, specifically for example, 0, 5, 6, 7, 8, 9, 10, 15, or 20 mass %, and can be in the range between the two values exemplified herein. When the content of the acrylonitrile-based monomer unit is within such range, the chemical resistance of the resin composition becomes superior. The content of the acrylonitrile-based monomer unit is a value measured by 13C-NMR.

Unsaturated dicarboxylic anhydride-based monomer unit is, for example, maleic anhydride, itaconic anhydride, citraconic anhydride, and aconitic anhydride. Among these, maleic anhydride is preferable. These unsaturated dicarboxylic anhydride-based monomer units can be used alone, or two or more of these can be used in combination.

The maleimide-based copolymer (A) preferably contains 0 to 10 mass % of unsaturated dicarboxylic anhydride-based monomer unit, more preferably 0 to 5 mass % of unsaturated dicarboxylic anhydride-based monomer unit with respect to 100 mass % of the maleimide-based copolymer (A). The content of the unsaturated dicarboxylic anhydride-based monomer unit is, specifically for example, 0, 1, 2, 3, 4, 5, 6, 7, 8, 9, or 10 mass %, and can be in the range between the two values exemplified herein. When the content of the unsaturated dicarboxylic anhydride-based monomer unit is within such range, the thermal stability of the maleimide-based copolymer becomes superior. The content of the unsaturated dicarboxylic anhydride-based monomer unit is a value measured by titration method.

The maleimide-based copolymer (A) according to one embodiment of the present invention preferably contains 30 to 70 mass % of maleimide-based monomer unit, 20 to 60 mass % of styrene-based monomer unit, 0 to 20 mass % of acrylonitrile-based monomer unit, and 0 to 10 mass % of unsaturated dicarboxylic anhydride-based monomer unit with respect to 100 mass % of the maleimide-based copolymer (A). More preferably, the maleimide-based copolymer (A) according to one embodiment of the present invention contains 35 to 60 mass % of maleimide-based monomer unit, 35 to 55 mass % of styrene-based monomer unit, 0 to 15 mass % of acrylonitrile-based monomer unit, and 0 to 5 mass % of unsaturated dicarboxylic anhydride-based monomer unit with respect to 100 mass % of the maleimide-based copolymer (A). When the content of the constituting unit is within such range, flowability, heat resistance, and thermal stability of the maleimide-based copolymer (A) becomes superior.

In terms of efficiently improving the heat resistance of the resin composition, the glass transition temperature (Tmg) of the maleimide-based copolymer (A) is preferably 175° C. to 205° C. The glass transition temperature is a value measured by DSC under the following measurement conditions.

Name of instrument: Robot DSC 6200 available from Seiko Instruments Inc.
Temperature elevation rate: 10° C./min The weight average molecular weight (Mw) of the maleimide-based copolymer (A) is preferably 60,000 to 150,000, more preferably 70,000 to 140,000. The weight average molecular weight is, specifically for example, 60,000, 70,000, 80,000, 90,000, 100,000, 110,000, 120,000, 130,000, 140,000, or 150,000, and can be in the range between the two values exemplified herein. When the weight average molecular weight (Mw) of the maleimide-based copolymer (A) is within such range, the impact strength of the resin composition becomes superior. In order to control the weight average molecular weight (Mw) of the maleimide-based copolymer (A), polymerization temperature, polymerization time, and amount of polymerization initiator added can be adjusted. In addition, concentration of solvent and amount of chain transfer agent added can also be adjusted. The weight average molecular weight of the maleimide-based copolymer (A) is a value of polystyrene equivalent measured by gel permeation chromatography (GPC), which is measured under following conditions.

Name of Instrument: SYSTEM-21 Shodex (available from Showa Denko K.K.)
Column: PL gel MIXED-B, 3 columns connected in series
Temperature: 40° C.
Detection: differential refractive index
Eluent: tetrahydrofuran
Concentration: 2 mass %
Calibration Curve: standard polystyrene (PS) (available from Polymer Laboratories Ltd) was used for preparation As the manufacturing method of the maleimide-based copolymer (A), known methods can be adopted. For example, a method in which a monomer mixture comprising styrene-based monomer, maleimide-based monomer, unsaturated dicarboxylic anhydride-based monomer, and other copolymerizable monomer is copolymerized can be mentioned. There is also a method in which a monomer mixture comprising styrene-based monomer, unsaturated dicarboxylic anhydride-based monomer, and other copolymerizable monomer is copolymerized, followed by imidization to allow a part of the unsaturated dicarboxylic anhydride-based monomer unit react with ammonia or primary amine to convert the part of the unsaturated dicarboxylic anhydride-based monomer unit into a maleimide-based monomer unit (hereinafter referred to as "post-imidizing method").

The polymerization method of the maleimide-based copolymer (A) includes, for example, solution polymerization and bulk polymerization. Solution polymerization is preferable from the viewpoint that a maleimide-based copolymer (A) with a more uniform copolymerization composition can be obtained by polymerizing while adding the monomer to be copolymerized divisionally for example. The solvent for solution polymerization is preferably non-polymerizable from the viewpoint that formation of byproduct and adverse effect can be suppressed. For example, ketone such as acetone, methyl ethyl ketone, methyl isobutyl ketone, acetophenone and the like; ether such as tetrahydrofuran, 1,4-dioxiane and the like; aromatic hydrocarbon such as benzene, toluene, xylene, chlorobenzene and the like; N,N-dimethylformamide; dimethyl sulfoxide; N-methyl-2-pyrrolidone and the like can be mentioned. In terms of easily removing solvent during devolatilization and recovery of the maleimide-based copolymer (A), methyl ethyl ketone and methyl isobutyl ketone are preferable. Polymerization process of any one of continuous polymerization process, batch process (batch), and semi-batch process can be applied. The polymerization method is not particularly limited. Here, radical polymerization is preferable since high productivity can be achieved with simple process.

In the solution polymerization or the bulk polymerization, polymerization initiator and chain transfer agent can be used, and the polymerization temperature is preferably in the range of 80 to 150° C. The polymerization initiator is azo compound such as azobisisobutyronitrile, azobiscyclohexanecarbonitrile, azobismethylpropionitrile, and azobismethylbutyronitrile; and peroxide such as benzoyl peroxide, t-butyl peroxybenzoate, 1,1-di-(t-butyl peroxy)cyclohexane, t-butyl peroxy isopropyl monocarbonate, t-butyl peroxy-2-ethylhexanoate, di-t-butyl peroxide, dicumylperoxide, and ethyl-3,3-di-(t-butylperoxy)butyrate. These polymerization initiators can be used alone, or two or more of these can be used in combination. From the viewpoint of the polymerization reaction rate and controlling of the rate of conversion, azo compounds and organic peroxides having a 10 hour half-life of 70 to 120° C. are preferable. The amount of the polymerization initiator used is not particularly limited. Here, the amount is preferably 0.1 to 1.5 mass % with respect to 100 mass % of the total monomer unit, more preferably 0.1 to 1.0 mass %. When the amount of the polymerization initiator used is 0.1 mass % or more, it is preferable since sufficient polymerization reaction rate can be achieved. When the amount of the polymerization initiator used is less than 1.5 mass %, the polymerization reaction rate can be suppressed, thereby allowing easy control of the reaction, resulting in obtaining the target molecular weight easily. The chain transfer agent is n-octyl mercaptan, n-dodecyl mercaptan, t-dodecyl mercaptan, α-methyl styrene dimer, ethyl thioglycolate, limonene, and terpinolene for example. The amount of the chain transfer agent used is not particularly limited, so long as it is in the range which allows to obtain the target molecular weight. Here, the amount of the chain transfer agent used is preferably 0.1 to 0.8 mass % with respect to 100 mass % of the total monomer unit, more preferably 0.15 to 0.5 mass %. When the amount of the chain transfer agent used is 0.1 to 0.8 mass %, the target molecular weight can be obtained easily.

As a method for introducing the maleimide-based monomer unit of the maleimide-based copolymer (A), a method in which the maleimide-based monomer is copolymerized and a post-imidizing method can be mentioned. Post-imidizing method is preferable since the amount of residual maleimide-based monomer in the maleimide-based copolymer (A) becomes less. The post-imidizing method is a method in which a monomer mixture comprising styrene-based monomer, unsaturated dicarboxylic anhydride-based monomer, and other copolymerizable monomer is copolymerized, followed by imidization to allow a part of the unsaturated dicarboxylic anhydride-based monomer unit react with ammonia or primary amine to convert the part of the unsaturated dicarboxylic anhydride-based monomer unit into a maleimide-based monomer unit. As the primary amine used in the post-imidizing method, for example, alkyl amine such as methylamine, ethylamine, n-propylamine, iso-propylamine, n-butylamine, n-pentylamine, n-hexylamine, n-octylamine, cyclohexylamine, and decylamine; chloro- or bromo-substituted alkyl amine; and aromatic amine such as aniline, toluidine, naphthylamine and the like can be mentioned. Among these, aniline is preferable. These primary amines can be used alone, or two or more of these can be used in combination. In the post-imidizing, a catalyst can be used to enhance the dehydration-ring-closing reaction during the reaction between the primary amine and the unsaturated dicarboxylic anhydride group. The catalyst is, for example, tertiary amine such as trimethylamine, triethylamine, tripropylamine, tributylamine, N,N-dimethylaniline, and N,N-diethylaniline. The temperature of the post-imidizing is preferably 100 to 250° C., more preferably 120 to 200° C. When the temperature of the imidizing reaction is 100° C. or higher, the reaction rate is sufficiently fast. Therefore, it is preferable in view of productivity. When the temperature of the imidizing reaction is 250° C. or lower, it is preferable since deterioration of the physical property due to thermal degradation of the maleimide-based copolymer (A) can be suppressed.

As the method for removing volatile component (devolatilization method) such as solvent used in the solution polymerization and unreacted monomer from the solution after the solution polymerization or from the solution after the post-imidizing of the maleimide-based copolymer (A), known method can be applied. For example, a vacuum devolatilization tank equipped with a heater and a devolatilization extruder equipped with a vent can be used. The molten maleimide-based copolymer (A) after devolatilization is transferred to the pelletizing step. The molten copolymer is extruded into strands from a porous die, and processed into pellets by cold cut method, air-cooled hot cutting method or underwater hot cutting method.

The content of the maleimide-based copolymer (A) in the resin composition is preferably 5 to 45 mass %, more preferably 7 to 35 mass %, and further preferably 10 to 30 mass %, and even further preferably 20 to 30 mass % when the total content of the maleimide-based copolymer (A) and the resin (B) is taken as 100 mass %. The content of the maleimide-based copolymer (A) in the resin composition is, specifically for example, 5, 10, 15, 20, 21, 22, 23, 24, 25, 26, 27, 28, 29, 30, 35, 40, or 45 mass %, and can be in the range between the two values exemplified herein. When the content of the maleimide-based copolymer (A) is too small, the heat resistance of the resin composition may not be improved sufficiently. On the other hand, when the content of the maleimide-based copolymer (A) is too large, the flowability decreases, and the molding property may deteriorate. Here, the resin contained in the resin composition can consist essentially of the maleimide-based copolymer (A) and the resin (B).

The resin (B) is selected from the group consisting of ABS resin, ASA resin, AES resin, and SAN resin. Such resins can be used alone, or two or more of these can be used in combination.

ABS resin, ASA resin, and AES resin are graft copolymers obtained by graft copolymerizing at least a styrene-based monomer and an acrylonitrile-based monomer to a rubbery polymer. For example, when butadiene-based rubber such as polybutadiene, styrene-butadiene copolymer is used as the rubbery polymer, the resin is ABS resin. When acryl-based rubber comprising butyl acrylate or ethyl acrylate is used as the rubbery polymer, the resin is ASA resin. When ethylene-based rubber such as ethylene-α-olefin copolymer is used as the rubbery polymer, the resin is AES resin. Two or more of these rubbery polymers can be used when graft copolymerization is performed.

As the manufacturing method of the graft copolymer such as ABS resin and the like, known methods can be adopted. For example, a manufacturing method performing emulsion polymerization or continuous bulk polymerization can be mentioned. The method which performs the emulsion polymerization is preferable since the content of the rubbery polymer in the final resin composition can be adjusted easily.

As the manufacturing method of the graft copolymer which performs emulsion polymerization, a method in which a styrene-based monomer and an acrylonitrile-based monomer are emulsion-graft polymerized to a latex of rubbery polymer can be mentioned (hereinafter referred to as "emulsion-graft polymerization method"). A latex of graft copolymer can be obtained by the emulsion-graft polymerization method.

In the emulsion-graft polymerization method, water, emulsifier, polymerization initiator, and chain transfer agent are used, and the polymerization temperature is preferably in the range of 30 to 90° C. Examples of the emulsifier include anionic surfactant, nonionic surfactant, and amphoteric surfactant. Examples of the polymerization initiator include organic peroxides such as cumene hydroperoxide, diisopropylbenzene peroxide, t-butyl peroxyacetate, t-hexyl peroxybenzoate, t-butyl peroxybenzoate; persulfates such as potassium persulfate and ammonium persulfate; azo-based compounds such as azobisbutyronitrile; reducing agents such as iron ion; secondary reducing agents such as sodium formaldehyde sulfoxylate; and chelating agents such as ethylenediaminetetraacetic acid disodium. Examples of the chain transfer agent include n-octylmercaptan, n-dodecylmercaptan, t-dodecyl mercaptan, α-methyl styrene dimer, ethyl thioglycolate, limonene, and terpinolene.

The latex of the graft copolymer can be solidified by a known method to collect the graft copolymer. For example, a coagulant is added to the latex of the graft copolymer to allow solidification, and then the graft copolymer is washed and dehydrated in a dehydrator followed by a drying step. Accordingly, a powdered graft copolymer is obtained.

In terms of impact-resistance, the content of the rubbery polymer in the graft copolymer obtained by the emulsion-graft polymerization method is preferably 40 to 70 mass %, more preferably 45 to 65 mass %. The content of the rubbery polymer can be adjusted by, for example, the ratio of the styrene-based monomer and the acrylonitrile-based monomer used with respect to the rubbery polymer when performing the emulsion-graft polymerization.

In terms of impact-resistance and chemical resistance, the constituting unit other than the rubbery polymer of the graft copolymer obtained by the emulsion-graft polymerization method are preferably 65 to 85 mass % of the styrene-based monomer unit and 15 to 35 mass % of the acrylonitrile-based monomer unit.

The gel component of the graft copolymer is preferably in the form of particles. The gel component is a particle of a rubbery polymer obtained by graft copolymerizing a styrene-based monomer and an acrylonitrile-based monomer. The gel component is a component which is insoluble in organic solvent such as methyl ethyl ketone and toluene, and can be separated by centrifugal separation. In some cases, an occlusion structure is formed, in which the styrene-acrylonitrile-based copolymer is encapsulated as particles inside the rubbery polymer particles. When the graft copolymer and the styrene-acrylonitrile-based copolymer are melt blended, the gel component exists as a dispersed phase in the form of particles in the continuous phase of the styrene-acrylonitrile-based copolymer. The gel content is a value calculated as follows. The graft copolymer of mass W is dissolved in methyl ethyl ketone, and then the solution is centrifuged at 20,000 rpm using a centrifuge to precipitate the insoluble matter. Subsequently, the supernatant liquid is removed by decantation to obtain the insoluble matter. From the mass S of dried insoluble matter after vacuum drying, the gel content (mass %)=(S/W)×100 is calculated. In a similar manner, gel content can be calculated by dissolving the resin composition in methyl ethyl ketone followed by centrifugal separation, the ABS resin composition obtained by melt blending the graft copolymer and the styrene-acrylonitrile-based copolymer.

In terms of the impact resistance and the appearance of the molded article, the volume average particle diameter of the gel component of the graft copolymer is preferably in the range of 0.10 to 1.0 μm, more preferably 0.15 to 0.50 μm. The volume average particle diameter is a value calculated as follows. Ultra thin sections are cut out from the pellets of the resin composition obtained by melt blending the graft copolymer and the styrene-acrylonitrile-based copolymer, and the cut out sections were observed with a transmission electron microscope (TEM) Image analysis of particles dispersed in the continuous phase was performed and calculation was conducted to obtain the volume average particle diameter. The volume average particle diameter can be adjusted by the particle diameter of the latex of the rubbery polymer used in the emulsion-graft polymerization for example. The particle diameter of the latex of the rubbery polymer can be adjusted by the addition method of the emulsifier and the amount of water used in the emulsion polymerization. The conditions to achieve the preferable range would result in long polymerization time and thus the productivity becomes low. Therefore, a method in which a rubbery polymer having a particle diameter of approximately 0.1 μm is polymerized in a short period of time and then the rubber particles are enlarged by chemical aggregation method or physical aggregation method can be mentioned.

The graft ratio of the graft copolymer is preferably 10 to 100 mass %, more preferably 20 to 70 mass % in terms of impact resistance. The graft ratio is a value calculated from the equation of "graft ratio (mass %)=[(G−RC)/RC]×100" based on the gel content (G) and the content of the rubbery polymer (RC). The graft ratio represents the content of the styrene-acrylonitrile-based copolymer contained in per unit mass of the rubbery polymer either by graft-bonding or by encapsulation. The graft ratio can be adjusted by, for example, the ratio of the monomer and the rubbery polymer, kind and amount of the initiator, amount of the chain transfer agent, amount of emulsifier, polymerization temperature, feeding method (lump/multistage/continuous), addition rate of monomer and the like during the emulsion-graft polymerization.

The degree of toluene swelling of the graft copolymer is preferably 5 to 20 times from the viewpoint of impact resistance and appearance of the molded article. The degree of toluene swelling represents the degree of crosslinking of the particles of the rubbery polymer, and is calculated as follows. The graft copolymer is dissolved in toluene, insoluble matter is separated by centrifugation or filtration, and the value of the degree of toluene swelling is calculated from the ratio of the mass in a state of being swollen with toluene and the mass in a dry state where toluene is removed by vacuum drying. The degree of toluene swelling is, for example, influenced by the degree of crosslinking of the rubbery polymer used in the emulsion graft polymerization, and can be adjusted by initiator, emulsifier, polymerization temperature, addition of polyfunctional monomer such as divinylbenzene and the like during the emulsion polymerization of the rubbery polymer.

SAN resin is a copolymer including a styrene-based monomer unit and an acrylonitrile-based monomer unit, such as styrene-acrylonitrile-based copolymer.

As the other copolymerizable monomers of the SAN resin, (meth)acrylic acid ester-based monomers such as methyl methacrylate; acrylic ester-based monomers such as butyl acrylate and ethyl acrylate; (meth)acrylic acid-based monomers such as methacrylic acid; acrylic acid-based monomers such as acrylic acid; N-substituted maleimide-based monomers such as N-phenyl maleimide can be used.

The constituting unit of the SAN resin is preferably 60 to 90 mass % of styrene-based monomer unit and 10 to 40 mass % of vinyl cyanide monomer unit, more preferably 65 to 80 mass % of styrene-based monomer unit and 20 to 35 mass % of vinyl cyanide monomer unit. When the constituting unit is within the above range, the balance between impact strength and flowability of the obtained resin composition is superior. The content of the styrene-based monomer unit and vinyl cyanide monomer unit are values measured by 13C-NMR.

As a manufacturing method of the SAN resin, known method can be adopted. For example, SAN resin can be manufactured by bulk polymerization, solution polymerization, suspension polymerization, emulsion polymerization and the like. The reaction apparatus can be operated by any of the continuous operation, batch operation, and semi-batch operation. In terms of quality and productivity, bulk polymerization and solution polymerization are preferable, and continuous operation is preferable. Examples of the solvents which can be used in bulk polymerization and solution polymerization include alkylbenzenes such as benzene, toluene, ethylbenzene and xylene; ketones such as acetone and methyl ethyl ketone; and aliphatic hydrocarbons such as hexane and cyclohexane.

In the bulk polymerization and solution polymerization of SAN resin, a polymerization initiator and a chain transfer agent can be used, and the polymerization temperature is preferably in the range of 120 to 170° C. Examples of the polymerization initiator include peroxy ketals such as 1,1-di (t-butylperoxy) cyclohexane, 2,2-di (t-butylperoxy) butane, 2,2-di (4,4-di-t-butylperoxycyclohexyl) propane, and 1,1-di (t-amylperoxy) cyclohexane; hydroperoxides such as cumene hydroperoxide and t-butyl hydroperoxide; alkyl peroxides such as t-butyl peroxyacetate and t-amyl peroxy isononanoate; dialkyl peroxides such as t-butyl cumyl peroxide, di-t-butyl peroxide, dicumyl peroxide, and di-t-hexyl peroxide; peroxyesters such as t-butyl peroxyacetate, t-butyl peroxybenzoate and t-butylperoxy isopropyl monocarbonate; peroxy carbonates such as t-butyl peroxy isopropyl carbonate and polyether tetrakis (t-butyl peroxy carbonate); N,N'-azobis (cyclohexane-1-carbonitrile); N,N'-azobis (2-methylbutyronitrile); N,N'-azobis (2,4-dimethylvaleronitrile); and N,N'-azobis[2-(hydroxymethyl) propionitrile]. These polymerization initiators can be used alone or two or more of these can be used in combination. Examples of the chain transfer agent include n-octyl mercaptan, n-dodecyl mercaptan, t-dodecyl mercaptan, α-methyl styrene dimer, ethyl thioglycolate, limonene, terpinolene and the like.

As the method for removing volatile component such as unreacted monomer and solvent used in the solution polymerization from the solution after polymerization of SAN resin, known method can be applied. For example, a vacuum devolatilization tank equipped with a pre-heater and a devolatilization extruder equipped with a vent can be used. The molten SAN resin after devolatilization is transferred to the pelletizing step. The molten copolymer is extruded into strands from a porous die, and processed into pellets by cold cut method, air-cooled hot cutting method or underwater hot cutting method.

In terms of the impact resistance and the molding property of the resin composition obtained, the weight average molecular weight of the SAN resin is preferably 50,000 to 250,000, more preferably 70,000 to 200,000. The weight average molecular weight is, specifically for example, 50,000, 60,000, 70,000, 80,000, 90,000, 100,000, 110,000, 120,000, 130,000, 140,000, 150,000, 160,000, 170,000, 180,000, 190,000, or 200,000, and can be in the range between the two values exemplified herein. The weight average molecular weight of the SAN resin is a value of polystyrene equivalent measured in THF solvent by gel permeation chromatography (GPC). Measurement is performed in a similar manner as the maleimide-based copolymer (A). The weight average molecular weight can be adjusted by the kind and amount of the chain transfer agent, solvent concentration, polymerization temperature, kind and amount of polymerization initiator and the like when polymerization is performed.

The resin (B) can be prepared, for example, by using a powdered ABS resin obtained by emulsion polymerization method and a pelletized SAN resin obtained by continuous bulk polymerization method. In addition, the resin (B) can be prepared by first melt blending, in an extruder or the like, a powdered ABS resin obtained by emulsion polymerization method and a pelletized SAN resin obtained by continuous bulk polymerization method, thereby obtaining the resin (B) as a pelletized ABS resin.

As a method for performing melt-kneading of the maleimide-based copolymer (A) and at least one resin (B) selected from the group consisting of ABS resin, ASA resin, AES resin, and SAN resin using an extruder, a known method can be adopted. As the extruder, known devices such as twin-screw extruder, single-screw extruder, multi-screw extruder, and continuous kneader with biaxial rotor can be mentioned. The twin-screw extruder is preferably used. In general, intermeshing co-rotating twin-screw extruder is widely used and is further preferable.

Figure 1:
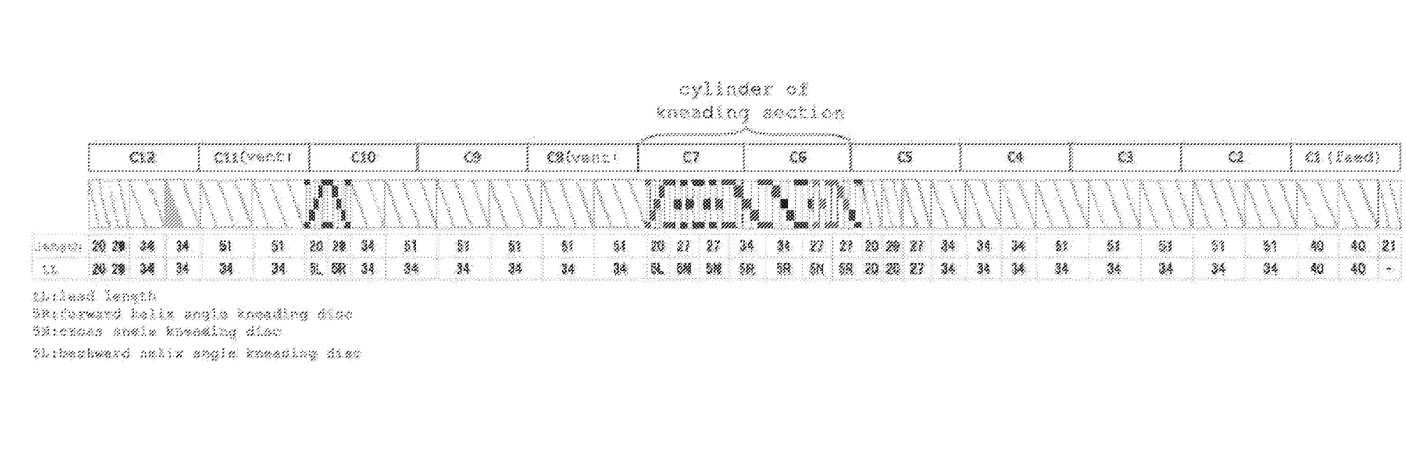
FIG. 1 is a configuration diagram of a twin-screw extruder in accordance with an embodiment of the present invention.

The twin-screw extruder according to an embodiment of the present invention is, as shown in FIG. 1 for example, structured by dividing the space where the cylinder is arranged into a plurality of sections, from the raw material charging portion towards the ejecting portion. Temperature of each of the sections can be controlled. The cylinder temperature of the kneading unit according to the present invention is a setting temperature of a section having the highest temperature among the sections where the materials are melt-kneaded and having a kneading unit cylinder (mixing element) arranged therein. The cylinder temperature of the kneading unit is preferably 220 to 330° C., more preferably 220 to 300° C. The cylinder temperature of the kneading unit is, specifically for example, 220, 230, 240, 250, 270, 280, 290, 300, 310, 320, or 330° C., and can be in the range between the two values exemplified herein.

As the screw of the twin-screw extruder according to an embodiment of the present invention, a screw having a large deep groove ratio is preferably used. The deep groove ratio of the screw is stipulated as the ratio D/d, in which "D" represents the outer diameter of the screw and "d" represents the root diameter. The deep groove ratio of the screw can be uniform throughout the entire screw, or can differ among the sections. The deep groove ratio of the screw of the kneading unit of the present invention is the deep groove ratio of the screw at the section having the highest temperature among the sections where the materials are melt-kneaded and having the mixing element arranged therein. In the embodiment of the present invention, in terms of productivity, the deep groove ratio of the screw of the kneading unit of the twin-screw extruder is preferably 1.55 or higher, and is more preferably 1.55 or higher and 1.70 or lower, and further preferably 1.55 or higher and 1.65 or lower. The deep groove ratio of the screw of the kneading unit is, specifically for example, 1.55, 1.56, 1.57, 1.58, 1.59, 1.60, 1.65, or 1.70, and can be in the range between the two values exemplified herein.

In terms of productivity, the extrusion during melt-kneading according to the embodiment of the present invention is preferably carried out under conditions where the value of $Q/D^{2.5}$ is in the range of 0.019 to 0.050, preferably 0.022 to 0.030 in which "Q (kg/h)" represents the jetting amount and "D (mm)" represents outer diameter of the screw. The value of $Q/D^{2.5}$ is, specifically for example, 0.019, 0.022, 0.025, or 0.028, and can be in the range between the two values exemplified herein.

In terms of dispersibility, the melt-kneading according to the embodiment of the present invention is preferably carried out under conditions where the value of $Ns/D^{-0.5}$ is in the range of 2600 to 5000, more preferably 4100 to 5000 in which "Ns (rpm)" represents the rotation number of the screw. The value of $Ns/D^{-0.5}$ is, specifically for example, 2600, 3100, 3600, 4100, 4600, or 5000, and can be in the range between the two values exemplified herein.

According to an embodiment of the present invention, the ratio of the melt viscosity of the maleimide-based copolymer (A) with respect to the melt viscosity of the resin (B) obtained with a shear rate of 120/sec and the afore-mentioned cylinder temperature of the kneading unit, that is, "melt viscosity of maleimide-based copolymer (A)/melt viscosity of resin (B)" is 1.0 or higher and lower than 3.4, preferably 1.0 or higher and lower than 2.2, and more preferably 1.0 or higher and lower than 1.8. The "melt viscosity of maleimide-based copolymer (A)/melt viscosity of resin (B)" is, specifically for example, 1 or higher, and is 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, or 3.3, and can be in the range between the two values exemplified herein.

When the ratio of melt viscosity is too high, the dispersity of the maleimide-based copolymer (A) deteriorates.

As a method for controlling the ratio of melt viscosity, adjustment of the cylinder temperature of the kneading unit, adjustment of the content of the monomer unit constituting the maleimide-based copolymer (A), and adjustment of the content of resin (B) can be mentioned for example. For example, the cylinder temperature of the kneading unit can be raised to decrease the melt viscosity ratio. In addition, the content of the maleimide-based monomer unit among the monomer units constituting the maleimide-based copolymer (A) can be decreased to decrease the melt viscosity ratio.

The melt viscosity is a value measured using a capillary rheometer with a capillary die of L=40 mm and D=1 mm, under conditions of a shear rate of 120/sec at the cylinder temperature of the kneading unit of the extruder. The kneading unit of the extruder means, for example in a twin screw-extruder, a section arranged with a screw element such as a kneading disc with high dispersibility.

The melt-kneading is preferably carried out in the presence of an antioxidant (C). As the antioxidant, hindered phenol-based antioxidant is preferable, and phosphorus-based antioxidant can be used in combination.

The hindered phenol-based antioxidant is an antioxidant having a phenolic hydroxyl group within its basic skeleton. As the hindered phenol-based antioxidant, for example, octadecyl-3-(3,5-di-t-butyl-4-hydroxyphenyl) propionate, ethylene bis(oxyethylene) bis[3-(5-tert-butyl-4-hydroxy-m-tolyl) propionate], 3,9-bis[2-{3-(3-tert-butyl-4-hydroxy-5-methylphenyl)propionyloxy}-1,1-dimethylethyl]-2,4,8,10-tetraoxaspiro[5.5]undecane, pentaerythritol tetrakis[3-(3,5-di-tert-butyl-4-hydroxyphenyl)propionate], 4,6-bis(octylthiomethyl)-o-cresol, 4,6-bis[(dodecylthio)methyl]-o-cresol, 2,4-dimethyl-6-(1-methylpentadecyl)phenol, tetrakis[methylene-3-(3,5-di-t-butyl-4-hydroxyphenyl)propionate]methane, 4,4'-thiobis(6-t-butyl-3-methylphenol), 1,1,3-tris(2-methyl-4-hydroxy-5-t-butylphenyl)butane 4,4'-butylidenebis(3-methyl-6-t-butylphenol), bis-[3,3-bis(4'-hydroxy-3'-tert-butylphenyl)-butanoic acid]-glycol ester, 2-t-butyl-6-(3-t-butyl-2-hydroxy-5-methylbenzyl)-4-methylphenyl acrylate, and 2-[1-(2-hydroxy-3,5-di-t-pentylphenyl)ethyl]-4,6-di-t-pentylphenyl acrylate can be mentioned. Preferably, as the hindered phenol-based antioxidant, octadecyl-3-(3,5-di-t-butyl-4-hydroxyphenyl) propionate, ethylene bis(oxyethylene) bis[3-(5-tert-butyl-4-hydroxy-m-tolyl) propionate], and pentaerythritol tetrakis[3-(3,5-di-tert-butyl-4-hydroxyphenyl)propionate]can be mentioned. Further preferably, as the hindered phenol-based antioxidant, octadecyl-3-(3,5-di-t-butyl-4-hydroxyphenyl) propionate can be mentioned. These hindered phenol-based antioxidants can be used alone, or two or more of these can be used in combination.

The phosphorus-based antioxidant is a phosphorous acid ester which is a trivalent phosphorus compound. As the phosphorus-based antioxidant, for example, 6-[3-(3-t-butyl-4-hydroxy-5-methylphenyl)propoxy]-2,4,8,10-tetra-t-butylbenz[d,f][1,3,2]dioxaphosphepine, 3,9-bis(2,6-di-tert-butyl-4-methylphenoxy)-2,4,8,10-tetraoxa-3,9-di phosphaspiro[5.5]undecane, bis(2,4-dicumylphenyl)pentaerythritol diphosphate, 2,2'-methylene bis(4,6-di-tert-butyl-1-phenyloxy) (2-ethylhexyloxy)phosphorus, tris(2,4-di-tert-butylphenyl) phosphite, phosphorous acid bis[2,4-bis (1,1-dimethylethyl)-6-methylphenyl]ethyl ester, bis(2,4-di-tert-butylphenyl)pentaerythritol diphosphate, cyclic neopentane tetrayl bis(octadecylphosphite), bis(nonylphenyl)pentaerythritol diphosphate, 4,4'-biphenylenediphosphinic acid tetrakis(2,4-di-tert-butylphenyl), 9,10-dihydro-9-oxa-10-phosphaphenanthrene-10-oxide, and tetrakis(2,4-di-tert-butyl-5-methylphenyl)-4,4'-biphenylene diphosphonate can be mentioned. Preferably, as the phosphorus-based antioxidant, for example, 6-[3-(3-t-butyl-4-hydroxy-5-methylphenyl)propoxy]-2,4,8,10-tetra-t-butylbenz[d,f][1,3,2]dioxaphosphepine, 3,9-bis(2,6-di-tert-butyl-4-methylphenoxy)-2,4,8,10-tetraoxa-3,9-di phosphaspiro[5.5]undecane, bis(2,4-dicumylphenyl)pentaerythritol diphosphate, 2,2'-methylene bis(4,6-di-tert-butyl-1-phenyloxy) (2-ethylhexyloxy)phosphorus, tris(2,4-di-tert-butylphenyl) phosphite, and bis(2,4-di-tert-butylphenyl)pentaerythritol diphosphate can be mentioned. More preferably, as the phosphorus-based antioxidant, for example, 6-[3-(3-t-butyl-4-hydroxy-5-methylphenyl)propoxy]-2,4,8,10-tetra-t-butylbenz[d,f][1,3,2]dioxaphosphepine, bis(2,4-dicumylphenyl)pentaerythritol diphosphate, tris(2,4-di-tert-butylphenyl) phosphite, and bis (2,4-di-tert-butylphenyl)pentaerythritol diphosphate can be mentioned. Further preferably, as the phosphorus-based antioxidant, for example, 6-[3-(3-t-butyl-4-hydroxy-5-methylphenyl)propoxy]-2,4,8,10-tetra-t-butylbenz[d,f][1,3,2]dioxaphosphepine, bis(2,4-dicumylphenyl)pentaerythritol diphosphate, and bis(2,4-di-tert-butylphenyl)pentaerythritol diphosphate can be mentioned. These phosphorus-based antioxidants can be used alone, or two or more of these can be used in combination.

When the cylinder temperature of the kneading unit is 290° C. or higher, it is preferable to further use a radical scavenger as the antioxidant (C). As the radical scavenger, 2-t-butyl-6-(3'-t-butyl-5'-methyl-2'-hydroxybenzyl)-4-methylphenyl acrylate and 2,4-di-t-amyl 6-[1-(3,5-di-t-amyl-2-hydroxyphenyl)ethyl]phenyl acrylate can be mentioned.

The addition amount of the antioxidant (C) is preferably 0.1 to 0.5 parts by mass, more preferably 0.3 to 0.5 parts by mass with respect to 100 parts by mass of the total sum of the maleimide-based copolymer (A) and the resin (B). The addition amount of the antioxidant (C) is, specifically for example, 0.1, 0.2, 0.3, 0.4, or 0.5 parts by mass, and can be in the range between the two values exemplified herein.

During the manufacture of the heat resistant resin composition, the heat resistant resin composition can be blended with other components to an extent that it does not impair the effect of the present invention. Such components include other resin components, impact resistance modifier, flowability modifier, hardness modifier, antioxidants, inorganic fillers, matting agents, flame retardants, flame retardant aid, anti-drip agents, sliding property imparting agent, heat dissipating material, electromagnetic wave absorbing material, plasticizers, lubricants, mold release agents, ultraviolet absorbers, light stabilizers, antibacterial agents, antifungal agents, antistatic agents, carbon black, titanium oxide, pigments, dyes, and the like.

EXAMPLE

Hereinafter, detailed explanation is provided with reference to Examples. However, the present invention is not limited to the following Examples.

Production Example of Maleimide-Based Copolymer (A-1)

Maleimide-based copolymer (A-1) was manufactured in accordance with the following procedures.

To an autoclave having a capacity of about 120 liters equipped with an agitator, 42 parts by mass of styrene, 10 parts by mass of acrylonitrile, 4 parts by mass of maleic anhydride, 0.6 parts by mass of 2,4-diphenyl-4-methyl-1-pentene, and 27 parts by mass of methyl ethyl ketone were charged. After replacing the gaseous phase of the system with nitrogen gas, the temperature was raised to 92° C. over 40 minutes with agitation. After raising the temperature, the temperature was kept at 92° C., and a solution prepared by dissolving 21 parts by mass of maleic anhydride and 0.15 parts by mass of t-butylperoxy-2-ethylhexanoate in 85 parts by mass of methyl ethyl ketone and 20 parts by mass of styrene were added continuously over 4.5 hours. Further, after completion of the addition of maleic anhydride, a solution prepared by dissolving 0.02 parts by mass of t-butylperoxy-2-ethylhexanoate in 9 parts by mass of methyl ethyl ketone and 3 parts by mass of styrene were added continuously over 30 minutes. After addition, the temperature of the reaction mixture was raised to 120° C., and the reaction was carried out for 30 minutes to complete polymerization. Thereafter, 23 parts by mass of aniline and 0.4 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide-based copolymer (A-1). (A-1) contained 52 mass % of styrene unit, 8 mass % of acrylonitrile unit, 39 mass % of N-phenyl maleimide unit, and 1 mass % of maleic anhydride unit. The weight average molecular weight was 80,000, and the glass transition temperature Tmg was 176° C.

Production Example of Maleimide-Based Copolymer (A-2)

Maleimide-based copolymer (A-2) was manufactured in accordance with the following procedures.

To an autoclave having a capacity of about 120 liters equipped with an agitator, 42 parts by mass of styrene, 10 parts by mass of acrylonitrile, 4 parts by mass of maleic anhydride, 0.03 parts by mass of 2,4-diphenyl-4-methyl-1-pentene, and 27 parts by mass of methyl ethyl ketone were charged. After replacing the gaseous phase of the system with nitrogen gas, the temperature was raised to 92° C. over 40 minutes with agitation. After raising the temperature, the temperature was kept at 92° C., and a solution prepared by dissolving 21 parts by mass of maleic anhydride and 0.15 parts by mass of t-butylperoxy-2-ethylhexanoate in 85 parts by mass of methyl ethyl ketone and 20 parts by mass of styrene were added continuously over 4.5 hours. Further, after completion of the addition of maleic anhydride, a solution prepared by dissolving 0.02 parts by mass of t-butylperoxy-2-ethylhexanoate in 9 parts by mass of methyl ethyl ketone and 3 parts by mass of styrene were added continuously over 30 minutes. After addition, the temperature of the reaction mixture was raised to 120° C., and the reaction was carried out for 30 minutes to complete polymerization. Thereafter, 23 parts by mass of aniline and 0.4 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide-based copolymer (A-2). (A-2) contained 52 mass % of styrene unit, 8 mass % ofacrylonitrile unit, 39 mass % ofN-phenyl maleimide unit, and 1 mass % of maleic anhydride unit. The weight average molecular weight was 140,000, and the glass transition temperature Tmg was 177° C.

Production Example of Maleimide-Based Copolymer (A-3)

Maleimide-based copolymer (A-3) was manufactured in accordance with the following procedures.

To an autoclave having a capacity of about 120 liters equipped with an agitator, 21 parts by mass of styrene, 14 parts by mass of acrylonitrile, 4 parts by mass of maleic anhydride, 0.03 parts by mass of 2,4-diphenyl-4-methyl-1-pentene, and 28 parts by mass of methyl ethyl ketone were charged. After replacing the gaseous phase of the system with nitrogen gas, the temperature was raised to 92° C. over 40 minutes with agitation. After raising the temperature, the temperature was kept at 92° C., and a solution prepared by dissolving 25 parts by mass of maleic anhydride and 0.18 parts by mass of t-butylperoxy-2-ethylhexanoate in 87 parts by mass of methyl ethyl ketone and 35 parts by mass of styrene were added continuously over 5 hours. After adding styrene, the temperature of the reaction mixture was raised to 120° C., and the reaction was carried out for 30 minutes to complete polymerization. Thereafter, 27 parts by mass of aniline and 0.4 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide-based copolymer (A-3). (A-3) contained 47 mass % of styrene unit, 10 mass % of acrylonitrile unit, 42 mass % of N-phenyl maleimide unit, and 1 mass % of maleic anhydride unit. The weight average molecular weight was 130,000, and the glass transition temperature Tmg was 184° C.

Production Example of Maleimide-Based Copolymer (A-4)

Maleimide-based copolymer (A-4) was manufactured in accordance with the following procedures.

To an autoclave having a capacity of about 120 liters equipped with an agitator, 62 parts by mass of styrene, 11 parts by mass of maleic anhydride, 0.2 parts by mass of 2,4-diphenyl-4-methyl-1-pentene, and 31 parts by mass of methyl ethyl ketone were charged. After replacing the gaseous phase of the system with nitrogen gas, the temperature was raised to 92° C. Subsequently, a solution prepared by dissolving 28 parts by mass of maleic anhydride and 0.19 parts by mass of t-butylperoxy-2-ethylhexanoate in 110 parts by mass of methyl ethyl ketone was added continuously over 7 hours. After addition, the temperature of the reaction mixture was raised to 120° C., and the reaction was carried out for 30 minutes to complete polymerization. Thereafter, 35 parts by mass of aniline and 0.6 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide-based copolymer (A-4). (A-4) contained 48 mass % of styrene unit, 51 mass % of N-phenyl maleimide unit, and 1 mass % of maleic anhydride unit. The weight average molecular weight was 130,000, and the glass transition temperature Tmg was 202° C.

<ABS Resin (B-1)>

Commercially available ABS resin GR-3500 (available from Denka Company Limited) was used.

<SAN Resin (B-2)>

SAN resin (B-2) was manufactured in accordance with the following procedures.

SAN resin was prepared by continuous bulk polymerization. One continuous stirred tank mixing vessel was used as the reactor, and polymerization was performed with a capacity of 30 L. A raw material solution containing 60 mass % of styrene, 22 mass % of acrylonitrile, and 18 mass % of ethyl benzene was prepared, and was continuously supplied to the reactor at a flow rate of 9.5 L/h. Further, t-butyl peroxy isopropyl monocarbonate as the polymerization initiator and n-dodecyl mercaptan as the chain transfer agent were continuously added to the supply line of the raw material solution so that the concentration would be 160 ppm and 400 ppm, respectively. The reaction temperature of the reactor was adjusted to 145° C. The polymer solution taken continuously from the reactor was supplied to the vacuum devolatilization tank equipped with a pre-heater, and unreacted styrene and acrylonitrile, and ethyl benzene were removed. Temperature of the pre-heater was adjusted so that the temperature of the polymer in the devolatilization tank would be 235° C., and the pressure in the devolatilization tank was set to 0.4 kPa. Polymer was taken out from the vacuum devolatilization tank using a gear pump and was extruded into strands. The strands were cooled in cooling water and were cut to obtain pelletized SAN resin (B-2). The constituting unit of (B-2) was 73.5 mass % of styrene unit and 26.5 mass % of acrylonitrile. The weight average molecular weight was 146,000.

Examples and Comparative Examples

Maleimide-based copolymer, ABS resin, and antioxidant were formulated by amount shown in Table 1 and were subjected to melt-kneading using an extruder under the conditions shown in Table 1, thereby obtaining a heat resistant resin composition. As the extruder, twin-screw extruder (TEM-26SX, available from TOSHIBA MACHINE CO., LTD, currently SHIBAURA MACHINE CO., LTD.) of L/D=48, external screw diameter of 26.5 mm, and deep groove ratio of the screw being 1.56 was used. The value of $Q/D^{2.5}$ during extrusion was 0.025, and the value of $Ns/D^{-0.5}$ during extrusion was 4633. The antioxidants used were as follows. Results of evaluation are shown Table 1.

(C-1) pentaerythritol tetrakis[3-(3,5-di-tert-butyl-4-hydroxyphenyl)propionate](Irganox 1010 available from BASF Japan Ltd.)

(C-2) tris(2,4-di-tert-butylphenyl) phosphite (Irgafos 168 available from BASF Japan Ltd.)

(C-3) 2-t-butyl-6-(3'-t-butyl-5'-methyl-2'-hydroxybenzyl)-4-methylphenyl acrylate (SUMILIZER GS, available from SUMITOMO CHEMICAL COMPANY, LIMITED)

(Melt Viscosity Ratio)

Melt viscosity of the maleimide-based copolymer and the ABS resin were measured under conditions of shear rate of 120/sec at the cylinder temperature of the kneading unit using a capillary die of L=40 mm and D=1 mm. Capillary rheometer 1D available from Toyo Seiki Seisaku-sho, Ltd. was used as the measurement instrument. The melt viscosity ratio was calculated from the measurement results.

(Melt Mass Flow Rate)

Melt mass flow rage was measured in accordance with JIS K7210, under conditions of 220° C. and 98 N load.

(Vicat Softening Temperature)

The Vicat softening temperature was measured in accordance with JIS K7206. Here, Method 50 (load: 50N, temperature elevation rate: 50° C./hour) was used, and the test specimen having the size of 10 mm×10 mm and 4 mm thickness was used. HDT & VSPT testing device available from Toyo Seiki Seisaku-sho, Ltd. was used as the measuring instrument.

(Charpy Impact Strength)

The Charpy impact strength was measured using a notched specimen in accordance with JIS K7111-1. Edgewise was adopted as the striking direction. Here, digital impact tester available from Toyo Seiki Seisaku-sho, Ltd. was used as the measuring instrument.

(Dispersion Level)

Injection molding machine (IS-50EPN, available from TOSHIBA MACHINE CO., LTD, currently SHIBAURA MACHINE CO., LTD.) was used under conditions of 220° C. cylinder temperature and 60° C. mold temperature to prepare a mirrored plate having a size of 90 mm length, 55 mm width, and 2 mm thickness. The dispersion condition of maleimide-based copolymer was observed visually and evaluated. When the dispersion condition of the maleimide-based copolymer is inferior, streaks are observed along the flow direction of the resin on the surface of the molded article.

Dispersion level 5: no defects observed, extremely superior appearance

Dispersion level 4: small streaks slightly observed

Dispersion level 3: small streaks observed

Dispersion level 2: streaks resulting in obvious appearance defect observed

Dispersion level 1: streaks resulting in obvious appearance defect observed all over the plate

TABLE 1

|   |   |   |   | Example | | | | | | | | | Comparative Example | |
|---|---|---|---|---|---|---|---|---|---|---|---|---|---|---|
|   |   |   |   | 1 | 2 | 3 | 4 | 5 | 6 | 7 | 8 | 9 | 1 | 2 |
| formulation | maleimide-based copolymer (A) | type | — | A-1 | A-1 | A-1 | A-1 | A-2 | A-2 | A-3 | A-4 | A-4 | A-4 | A-3 |
|   |   | amount | mass % | 28 | 28 | 15 | 20 | 28 | 28 | 26 | 22 | 22 | 22 | 26 |
|   | ABS resin (B-1) |   | mass % | 72 | 72 | 85 | 70 | 72 | 72 | 74 | 78 | 78 | 78 | 74 |
|   | SAN resin (B-2) |   | mass % | — | — | — | 10 | — | — | — | — | — | — | — |
|   | total amount of maleimide-based copolymer (A) and ABS resin (B-1) |   | parts by mass | 100 | 100 | 100 | 100 | 100 | 100 | 100 | 100 | 100 | 100 | 100 |
|   | antioxidant (C-1) |   | parts by mass | 0.30 | 0.30 | 0.30 | 0.30 | 0.30 | 0.30 | 0.30 | 0.10 | — | 0.30 | 0.30 |
|   | antioxidant (C-2) |   | parts by mass | 0.15 | 0.15 | 0.15 | 0.15 | 0.15 | 0.15 | 0.15 | 0.05 | — | 0.15 | 0.15 |
|   | antioxidant (C-3) |   | parts by mass | — | — | — | — | — | — | — | 0.35 | — | — | — |
| extrusion condition | cylinder temperature of kneading unit |   | ° C. | 240 | 260 | 260 | 260 | 280 | 240 | 280 | 300 | 300 | 280 | 260 |
|   | ejection amount |   | kg/h | 90 | 90 | 90 | 90 | 90 | 90 | 90 | 90 | 90 | 90 | 90 |
|   | screw rotation number |   | rpm | 900 | 900 | 900 | 900 | 900 | 900 | 900 | 900 | 900 | 900 | 900 |
|   | melt viscosity ratio |   | — | 1.7 | 1.5 | 1.5 | 1.5 | 1.8 | 2.4 | 2.6 | 2.6 | 2.6 | 4.5 | 3.6 |
| evaluation result | melt mass flow rate (220° C. 98N) |   | g/10 min | 9.9 | 10.0 | 14.9 | 13.8 | 6.6 | 6.5 | 5.3 | 5.8 | 6.4 | 5.6 | 5.1 |
|   | Vicat softening temperature |   | ° C. | 113 | 113 | 108 | 110 | 113 | 113 | 113 | 113 | 112 | 113 | 113 |
|   | Charpy impact strength |   | kJ/m$^2$ | 9 | 9 | 15 | 7 | 0 | 10 | 10 | 12 | 9 | 12 | 10 |
|   | dispersion level |   | — | 5 | 5 | 5 | 5 | 4 | 3 | 3 | 3 | 3 | 2 | 2 |

From the results shown in Table 1, by performing melt-kneading within an appropriate range of melt viscosity rate, a heat resistant resin composition with superior dispersibility of maleimide-based copolymer can be manufactured.

INDUSTRIAL APPLICABILITY

With the manufacturing method of the present invention, a heat resistant resin composition with superior dispersibility of maleimide-based copolymer can be obtained with high productivity, and the molded article obtained therefrom is superior in appearance.

The invention claimed is:

1. A method for manufacturing a heat resistant resin composition, the method comprising:
a melt-kneading step to melt and knead a maleimide-based copolymer (A) and at least one resin (B) selected from the group consisting of ABS resin, ASA resin, AES resin, and SAN resin with an extruder; wherein:
a ratio of a melt viscosity of the maleimide-based copolymer (A) with respect to a melt viscosity of the resin (B) obtained with a shear rate of 120/sec and a cylinder temperature of a kneading unit of the extruder is 1.0 or higher and lower than 3.4.

2. The method for manufacturing the heat resistant resin composition of claim 1, wherein the melt-kneading step is performed under presence of an antioxidant (C).

3. The method for manufacturing the heat resistant resin composition of claim 1, wherein the extruder is a twin-screw extruder.

4. The method for manufacturing the heat resistant resin composition of claim 3, wherein a deep groove ratio of a screw of the kneading unit of the twin-screw extruder is 1.55 or higher.

5. The method for manufacturing the heat resistant resin composition of claim 2, wherein the extruder is a twin-screw extruder.

6. The method for manufacturing the heat resistant resin composition of claim 5, wherein a deep groove ratio of a screw of the kneading unit of the twin-screw extruder is 1.55 or higher.

\* \* \* \* \*